United States Patent
Illingworth

(10) Patent No.: US 6,623,352 B2
(45) Date of Patent: Sep. 23, 2003

(54) VORTEX AIR BARRIER

(75) Inventor: Lewis Illingworth, Kensington, NH (US)

(73) Assignee: Vortex Holding Company, Avenel, NJ (US)

( * ) Notice: Subject to any disclaimer, the term of this patent is extended or adjusted under 35 U.S.C. 154(b) by 139 days.

(21) Appl. No.: 09/895,961

(22) Filed: Jun. 29, 2001

(65) Prior Publication Data

US 2003/0031558 A1 Feb. 13, 2003

Related U.S. Application Data

(63) Continuation-in-part of application No. 09/871,597, filed on May 31, 2001, now Pat. No. 6,464,459, which is a continuation-in-part of application No. 09/728,602, filed on Dec. 1, 2000, which is a continuation-in-part of application No. 09/316,318, filed on May 21, 1999.

(51) Int. Cl.[7] ................................................. F24F 9/00
(52) U.S. Cl. ...................... 454/189; 454/190; 454/188; 454/191
(58) Field of Search ................................. 454/188, 189, 454/190, 191, 192, 193

(56) References Cited

U.S. PATENT DOCUMENTS

| | | | | |
|---|---|---|---|---|
| 3,023,688 A | * | 3/1962 | Kramer, Jr. | 454/190 |
| 3,279,883 A | * | 10/1966 | Thompson et al. | 422/4 |
| 4,298,341 A | * | 11/1981 | Nowack | 432/64 |
| 4,516,482 A | * | 5/1985 | Smith | 454/191 |
| 4,597,193 A | * | 7/1986 | Kallfass | 34/224 |
| 6,095,918 A | * | 8/2000 | Arroyo et al. | 454/188 |
| 6,361,431 B1 | * | 3/2002 | Kawano | 454/228 |

FOREIGN PATENT DOCUMENTS

| | | | | |
|---|---|---|---|---|
| DE | 1 120 104 | * | 12/1961 | 454/191 |
| FR | 2 421 004 | * | 10/1979 | 454/191 |
| JP | 61-24936 | * | 2/1986 | 454/188 |
| JP | 61-159041 | * | 7/1986 | 454/188 |
| SU | 1325259 | * | 7/1987 | 454/188 |

* cited by examiner

Primary Examiner—Harold Joyce
(74) Attorney, Agent, or Firm—Ward & Olivo

(57) ABSTRACT

An air barrier system is disclosed that allows the isolation of a central volume or one volume from another without the use of physical barriers. Toroidal vortices are formed at opposing end or ends of the volume to be isolated and prevent transport inward and outward. Contemplated applications include air curtains, oxygen tents, cleanrooms and testing chamber apparatus.

35 Claims, 1 Drawing Sheet

VORTEX AIR BARRIER

CROSS REFERENCE TO OTHER APPLICATIONS

This application is filed as a continuation-in-part of co-pending application Ser. No. 09/871,597 filed May 31, 2001 now U.S. Pat. No. 6,464,457 entitled "Lifting Platform With Energy Recovery" which is a continuation-in-part of co-pending application Ser. No. 09/728,602, filed Dec. 1, 2000, entitled "Lifting Platform" which is a continuation-in-part of co-pending application Ser. No. 09/316,318, filed May 21, 1999, entitled "Vortex Attractor."

TECHNICAL FIELD OF THE INVENTION

The present invention relates initially, and thus generally, to means of forming "air barriers" that serve to isolate spaces without the use of a conventional physical barrier. The isolated space may be maintained at atmospheric pressure, or at greater or lesser than atmospheric pressure.

BACKGROUND OF THE INVENTION

There are many possible uses of systems that utilize an air barrier to isolate one region from another. Air barriers are unique because they lack bulky physical structures that would normally be associated with any type of conventional barrier system. Air barriers find use in many different fields, including, but not limited to: air curtains, clean rooms, oxygen tents and testing chamber apparatus.

Air Curtains

An air curtain is a device specifically designed to provide a resistance to air flow through an opening, without utilizing a physical barrier. Simply put, an air curtain is a fan that is designed with an air outlet that has a low turbulent air stream (as laminar a flow as possible) that can be angled towards the incoming air stream in such a manner that the inflow of air can be prevented, and thereby creates a seal.

Air curtains can either be of the re-circulating type, or non re-circulating type. Conventional re-circulating air curtains emit air from a discharge grill on one side of the door opening and collect the air on the opposite side. It is then filtered, sometimes heated, and then is returned to the discharge grille. These units are essentially a modified heating system and use large amounts of air. They are usually associated with high initial costs and high operating costs. Also, because the air has to be filtered, the maintenance costs are also quite high. The feature is that they use low velocity air streams, which is desirable in some commercial entrances. They are usually used in supermarkets and store entrances. Thus, the need is apparent to provide an improved re-circulating air curtain.

Non re-circulating air curtains are more widely used. They are commonly characterized by lower initial and operating costs. Since non-recirculating air curtains do not re-use the air, they do not normally have to be filtered and thereby can be made essentially maintenance free.

The non-recirculating air curtain operates by discharging air at a high velocity through a narrow discharge nozzle. The discharged air stream must have the proper angle, usually 20 degrees towards the pressure side, and the air stream must be laminar for highest efficiency.

The non-recirculating air curtain operates on a very simple law of physics. One object will change its direction if it is subjected to a force, or a momentum, from another object. The momentum is found by the product of the air mass and the velocity at which it travels. The force could also be from an air mass that is increasing its velocity. The outside wind has a certain mass and a certain velocity, so does the air curtain stream. If the air curtain force (or momentum of the airflow) is equal and opposed to the force (or momentum of the airflow) from the draft through the door then the draft is prevented from entering, i.e., conservation of momentum. If the draft is much stronger than the air curtain, it will break through and some will enter. However, even in this circumstance, an air curtain will prevent some of the outside wind from entering at all times. If the air curtain is much stronger than the draft some of the air will go outside. The strength of the non-recirculating air curtain follows the formula: mass times the velocity squared. Therefore, an air curtain that blows at twice the speed has four times the wind stopping power at the same air volume.

An air curtain can be mounted above, on one side, or on both sides of a door. The most common way is to mount an air curtain above the door. Mounting the air curtain in this fashion is usually preferred because it keeps the unit out of the way and is less likely to be damaged by, for example, forklifts. It is also the most economical way of installing an air curtain. The drawback is that a small amount of air at the extreme bottom of the doorway may enter due to the height of air curtain.

An air curtain can also be mounted vertically on one side of the door. There are some disadvantages to this, however. If, for example, a truck is parked in the doorway then the entire doorway is unprotected because the truck will break the air stream. Also, with the unit mounted on one side of the door it is more likely to be damaged. Further, if there is no equal force on the other side of the door to stop the stream then the flow will follow the wall for some distance and may disturb people who are standing in the air stream.

The final way of mounting an air curtain is on both sides of the door with the air streams flowing towards each other. This is the most comfortable way of installing an air curtain as it eliminates the above drawbacks, except the possibility of damage.

In order to be able to select a proper air curtain for a given application, there are a few things that have to be considered:

(1) The physical dimensions of the opening and the space available for installation.

(2) Prevailing winds and temperatures for the opening.

(3) If there is any negative pressure in the building (this is usually caused by exhaust fans or stack effect.)

(4) The need for additional heat to be introduced in the air curtain.

(5) The need for additional heat in the areas when the door is closed and/or the need for make up air in the building.

The applications for air curtains are many. They include:
(1) Industrial Climate Control
(2) Air Conditioned Areas
(3) Industrial Oven Openings
(4) Dust and Humidity Control
(5) Mines
(6) Commercial Entrances
(7) Insect Control
(8) Cold Storage Each of this applications will be briefly described.

Industrial Climate Control

The primary purpose of a climate control air curtain is to prevent the influx of outside air through an opening into a heated or cooled area. Openings where an air curtain would typically be used include exterior shipping and receiving doors to plants and warehouses and interior doors between plant areas of different temperatures (these applications are discussed in further detail infra). In addition, there are special applications such as the control of oven temperature, humidity and dust or the control of fresh air. Other applications include preventing the drifting of over spray from spray paint booths; blowing water off of hot steel after it has been dipped; and blowing scrap paper from a paper cutter into a collecting intake.

In order to control climate, an air curtain emits an air stream with enough velocity at a nozzle having a width commensurate with the width of the opening. For different door sizes and different wind conditions, different air velocities at the nozzle are required.

To prevent the entry of outside winds, the discharge nozzle is angled outward so that the air leaving it meets the wind trying to enter. The wind will meet or strike the air curtain stream in the doorway. When the vector representative the air stream (generated by the air curtain) and the vector representing the wind equalize, they form a resultant which should meet the floor in the door plane for maximum efficiency.

In buildings with high ceilings the air tends to stratify into a warmer layer at the ceiling and a considerably cooler one at the floor. For such buildings it is recommended that the air curtain be mounted across the top of the doorway opening and that it be provided with a top intake connected to a duct extending up to the ceiling. The warm air will then be drawn down into the air curtain and blown to the floor putting otherwise wasted heat to use. This warmer air also helps to reduce the wind chill of the moving air.

Air Conditioned Areas

Air conditioned areas are normally well balanced and seldom have negative pressure. In fact a slight over-pressure is more common where air conditioning systems are bringing fresh air into an area. Air curtains for interior doors need only be sized for the draft due to the temperature differences between the two sides. On interior openings between the air conditioned areas and non air conditioned areas, the air curtain should be mounted on the non air conditioned side. Doors between an air conditioned area and outside air are exposed to winds which must be considered in the selection of the air curtain. For application on such doors, the air curtain should be installed on the inside for the best possible efficiency, and the nozzle angle should be adjusted so that a minimum of cooled air is discharged from the inside. This inside mounting allows the air curtain to be used in the winter to prevent cold outside air from entering.

Industrial Oven Openings

It has been shown that using air curtains on openings to ovens has resulted in fuel savings of up to 40% of the total oven fuel consumption. Air Curtains are normally installed horizontally over the oven opening and angled slightly inward toward the oven to contain the hot air that is trying to come out at the top. Many air curtains are successfully operating on ovens with temperatures up to 475° F. The air curtain drive motor should be located to the side of the oven opening to protect them from damage from hot air that would escape in the even of a shutdown of the air curtain. Oven applications should be designed case by case to meet each set of unique conditions.

Dust and Humidity Control

Air curtains should be installed on the clean or humidity controlled side of the opening, blowing toward the dirty or uncontrolled side. This will prevent the influx of the dust particles or atmospheric vapor. Common air curtain units for dust and humidity control are approximately 70% efficient. The 30% inefficiency is caused by particles of air becoming entrained in the air curtain stream and working their way through.

Mines

Air Curtains are in use in a mines, e.g., the hard rock type, at up to 1100 foot depths to control the flow of fresh air that is introduced into the mine. Installed at several points along the main airway, the air curtain deflects some of the fresh air flow out into the shafts.

Commercial Entrances

Commercial entrance air curtains are becoming widely used in building entrances to reduce energy consumption and provide comfort. In winter they retain warm inside air and prevent the influx of cold air. They can also supply additional heat in the door area using electrical, steam or hot water heaters. In the summer, air curtains keep hot humid air out and prevent the escape of cooled air. The working principle of commercial entrance air curtains is to provide the most effective air screen possible without blowing so hard that it is objectionable to people passing through.

Air curtains are ideal for application in high traffic doorways in commercial establishments such as stores, restaurants and banks. They are also ideal for public buildings such as hospitals, terminals and schools. In many cases where a vestibule was installed, or planned, to reduce the inflow, an air curtain is a better approach. This is particularly true for high traffic entrances where both doors are frequently open at the same time, defeating the purpose of the vestibule. A continuously operating air curtain allows the vestibule to be dispensed with, resulting in large savings—both in initial and operating costs—and increasing the usable floor space.

Commercial entrance air curtains are normally mounted horizontally above a door, thereby keeping the unit out of the way and practically eliminates any chance of damage and/or accidents. During the heating season, the air stream should be directed slightly toward the outside and should never be obstructed by door operators or the door header. It is commonly recommended that the air curtain fan motor run continuously, since the power needed to operate it is minimal.

It is preferable to control the heater in heated units with a built-in or wall mounted thermostat in order to maintain a constant, comfortable temperature in the entrance area. The heater unit also provides comfort through the elimination of cold drafts and the addition of heat to door areas. Commercial entrance air curtains have many other benefits. For example, they can decrease door maintenance costs since doors need to be opened and closed less often. In restaurants they stop uncomfortable cold drafts at customers' feet. Many schools purchase air curtains to save energy and find that, as an additional benefit, they keep floors dry and safe and hallways warm during the winter months. In buildings with high ceilings, the air curtain re-circulates the warm stratified air that rises to the ceiling.

Commercial entrance air curtains are quiet and compact and commonly pay for themselves in a very short time. Most units may be used all year round and are adjustable for seasonal conditions using either a damper or a dual speed motor.

Insect Control

Insect control air curtains, sometimes called "Fly Fans," are used in food processing plants, dairies, bakeries, bottling plants, restaurants, supermarkets, hospitals, school cafeterias and other areas where the control of flying insects is required. The powerful stream of air that is produced by an insect control air curtain is an excellent deterrent to insects which will usually avoid the air stream simply because of it's unnaturally high velocity.

The most commonly effective air curtain design for insect control has a nozzle that can angle the air stream away from the area to be protected. An angle of about 20° from the vertical is usually optimal. The unit should meet or exceed Department of Agriculture and Federal Drug Administration standards, which call for an air stream 2–inches wide at the nozzle capable of producing a minimum velocity of 1600 fpm of air 3 feet above the floor and across the entire door opening. It is very important that the entire doorway be covered so that there are no gaps for the insects to enter.

The insect control air curtains can be mounted on the inside or outside of the doorway. When mounted on the inside the unit can help control the building's climate in the winter by stopping the influx of cold outside air. When the building contains odors which are attractive to flying insects it is recommended that the air curtain be mounted on the outside.

When a negative pressure exists inside the building, one of two approaches must be taken to make the air curtain fully effective in keeping the flying insects out. One alternative is to slightly alter the mounting of the unit, moving it out from the wall to relieve pressure on the air curtain and to allow the outside air to enter the building. The outside air will be drawn to the intake of the curtain through the gap between the wall and the unit. This gap must be covered by a screen and the gaps along the door jamb, caused by moving the unit back from the wall, should be closed by side panels.

The air curtain could be equally effective mounted horizontally or vertically. However, measures should be taken to prevent damage to the air curtain caused by traffic when mounted vertically.

Cold Storage

When opened, a door separating a cold storage area from a warm room permits a substantial loss of refrigerated air. The cold air immediately absorbs heat from the warm air. This is detrimental to the cold storage area in several ways. There are significant energy losses and safety hazards in the form of condensation and icing on the floor and fog in the doorway. Also, if enough heat is absorbed by the refrigerated area for a sufficient period of time, there may be food spoilage. Strip doors used on coolers and freezers to reduce these effects impair visibility and are unpleasant to pass through due to condensation and frosting and accumulate dirt and possible bacterial growth.

It has been proven that air curtains, when properly sized and adjusted, are up to 85% efficient in controlling the flow of air through cooler and freezer doorways. If the cold storage door is open over one hour per day, an air curtain is a cost effective way to save refrigeration costs.

Installed on the warm side of the doorway, the air curtain emits an air stream that reaches the floor at an angle and splits into two separate air streams. By properly adjusting the volume of the air and the angle of the nozzle, one air stream is made to balance against the other which is trying to leave the cooled room, while the other counteracts the warm air trying to enter. The correct air curtain sizing and adjustments must be made for each specific application so that a narrow, high velocity, low volume stream of air is projected over the entire opening creating a sufficiently stiff curtain of air. Built-in adjustments in an air curtain preferably include fully adjustable mounting brackets, variable volume controls and individually adjustable louvers in the nozzle. The narrow nozzle limits the amount of air in the doorway area and hence the turbulence, thus increasing the efficiency of the unit.

In addition to providing a substantial energy savings and increased safety, cold storage air curtains can increase the time between defrosting almost four fold, depending on the particular freezer or cooler. Also, their ability to maintain the cold room temperature right up to the doorway improves product quality and increases the useful floor space.

Clean Rooms

Clean rooms are commonly in use in manufacturing and research facilities. Simply defined, they are a dust-free working area with strict temperature and humidity control. Such control is of vital importance in the manufacture of equipment sensitive to environmental contamination, such as components for electronic and aerospace systems. Commonly, seamless plastic walls and ceilings, rounded corners, external lighting and wiring, a continuous influx of dust-free air, and daily cleaning are characteristic features. Clean room workers wear special clothing, including head coverings, and, on entering, pass through an air blast, or air shower, to remove particles. Workpieces for assembly enter through an airlock. The complicated structure of such clean rooms would benefit from a system that does not utilize physical barriers to prevent entry of particles into the isolated area.

Oxygen Tents

Oxygen tents perform two main functions: to supply oxygen-enriched breathing air (30 to 50% oxygen content) to the occupant and to cool the air within the tent by 5 to 8 degrees centigrade. It is used in the treatment of respiratory diseases and heart diseases and in certain cases for the care of persons recovering from serious operations. In cases where the patient's breathing functions are impaired, the oxygen tent can ensure that the normal oxygen content in her or his blood is maintained, and the body temperature of a patient with very high fever can be kept down.

The oxygen tent traditionally consists mainly of a transportable cabinet (accommodating the air-circulating equipment, electric cooling unit, oxygen-dispensing unit, water atomizer, and control apparatus) and the actual tent comprising the supporting frame and the envelope, which is fitted around the patient's bed so as to enclose it completely. A fan draws air out of the tent and passes it through a dust filter to the cooling unit. The moisture in the exhaled air is condensed and thus removed. The air is then re-circulated to the tent and is enriched with oxygen. If necessary, the atmosphere humidity can be increased by means of an artificial fog produced by the atomizer. The tent is provided with large opening, closed by zippers (zip fasteners), to give access to the patient.

However, enclosure into the solid envelope is usually uncomfortable for the conscious patient, and is unbearable by those afflicted with claustrophobia. Therefore, it is desirable to provide an oxygen tent that does not enclose a patient inside a small chamber.

Testing Chamber Apparatus

There are a variety of testing chamber apparatus used in product testing and development. Most of these apparatus focus on exposing a product or sample to a variety of environmental conditions. Commonly, the conditions are quite extreme. For example, a chamber can be made that exposes the product or sample to a certain level of humidity, temperature, or ambient pressure (to simulate the effects of varying altitude, or depth of submersion). Each of these systems require a barrier between the ambient region and the test volume. The barriers utilized in the past are almost exclusively physical in nature. The use of physical barriers means that the testing apparatus occupies a large amount of space, is heavy, bulky and expensive. One such common testing apparatus is the thermal shock chamber.

The need for true thermal shock testing has been expanding rapidly due, in part, to the enormous competitive pressures existent, particularly within the general electronics industry. The utilization of these latest technological advances for applications in medicine, computer technology, space exploration, defense research, even the automotive industry, are testimony to the increased necessity to produce products with the highest possible reliability quotient.

Thermal shock testing assists in achieving this reliability objective. Currently, more and more manufacturers are turning to full temperature cycling or thermal shock testing of their electronic components, semiconductors, computers, instruments and peripheral electronic equipment.

Thermal shock chambers allow the test specimen to be automatically and repeatedly transferred from a hot environment to a cold environment or the reverse of this temperature sequence. This process is defined as true thermal shock, as opposed to thermal cycling, wherein the specimen is introduced into the chamber and the chamber temperature is then cycled; a process which may require two hours to ramp up or down and attain, for example, a 265° C. temperature variation.

Common thermal shock test chambers comprise two or three zones with a hot chamber, cold chamber, and/or ambient chamber. Chamber sizes are commonly available up to and beyond 27 cubic feet of interior workspace. Thus, the space, weight, and bulk of the physical chambers are significant, and it is desirable that they be reduced.

Survey of the Prior Disclosures

Research of the relevant prior art has found it to be devoid of references pointed to the creation of an air barrier through use of vortex forces. However, the following represent the references that the inventor believes to be the most relevant. One skilled in the art will plainly see that even these do not approach the scope of the present invention.

Berner et al U.S. Pat. No. 3,294,006 describes an apparatus for providing an enhanced efficiency air curtain used at an open doorway. Particularly, the central object of the invention is to attain with one air curtain, the efficiency commonly associated with the use of two air curtains. This is accomplished by arranging an ejection suction with the air stream from the air curtain outlet. The purpose of the suction is to suck in air or other gas and direct it, with a minimum of mixing, in the direction desired. This effect is obtained by making the nozzle length, after the ejection takes place, short enough to avoid total mixing, but long enough to get a satisfactory suction. When suction is arranged from one side only of the ejection outlet with a nozzle of proper length, all or nearly all of the sucked in air is transferred over to the opposite side of the curtain. While Berner et al does present a means for increasing the efficiency of conventional air curtains, the use of a vortex flow is neither disclosed nor contemplated.

Berlant U.S. Pat. No. 3,327,935 is directed to an air curtain having multiple blowers and changeable air inlet vanes for regulation of the air supply. The variable volumetric capacity allows adapting the air curtain to changing seasons or other changes in the output of air from the device. Also, Berlant teaches means that enhances the uniformity of output throughout the full width of the air curtain. The system of Berlant allows for adjustability to changing conditions and uniformity along its width, however, does not utilize a similar flow geometry to that described herein.

Berner et al U.S. Pat. No. 3,362,469 discloses an improved air curtain device for use between a hot and cold area. The air curtain is designed to be adjustably mounted to vary the angle with respect to the doorway in order to take controlled amounts of cold air admixed with warm air. Also, it employs a tangential impeller to help ensure a uniform, laminar flow along the width of the air curtain. Nonetheless, Berner et al does not teach the use of a vortex flow to isolate a region.

Szatmary U.S. Pat. No. 5,997,399 teaches an apparatus for providing a clean working environment. The apparatus includes an isolation booth, a worker booth, and an access device arranged to enable a worker in the worker booth to handle material in an isolation chamber formed in the isolation booth. A pressure generator is coupled with the isolation chamber to generate an air pressure that is less than the air pressure of an air curtain passing through the worker booth. This is done so that air is drawn from the air curtain in the worker booth into the isolation chamber through any air leak opening that develops in and around the access device so as to block outflow of air in the isolation chamber to the worker booth through the air leak opening. Szatmary is directed only to a chamber having an air curtain that maintains a seal between the worker and the dangerous materials such that should a leak develop in the chamber, the worker will remain safe. Szatmary does not address the use of a vortex flow to isolate the worker from the dangerous materials.

Armstrong U.S. Pat. No. 6,105,653 is directed to an air circulation barrier for use within a vehicle interior. A header is mounted within the interior of a vehicle and secured against the roof portion to extend transversely with respect to the front to back directions of the vehicle. The header supports a roller which in turn supports a flexible transparent or clear curtain which may be drawn downwardly to provide a portion of the vehicle an air barrier to divide one portion from the other. A pair of side curtains are provided along each edge of the center curtain and are extendable outwardly to provide a further barrier to air circulation or air flow past the barrier. In one embodiment, the side curtains are formed of a flexible material and are hingedly secured to the vertical edges of the center curtain. In an alternate embodiment, a pair of side rollers are pivotally secured to the header and support respective side curtains which may be extended downwardly and drawn outwardly to complete the air barrier. Armstrong teaches the use of a physical barrier to separate airspace within a vehicle in order to conserve air conditioning and heating resources. Armstrong does not teach the use of any type of fluid flow to act as a barrier.

Long et al U.S. Pat. No. 6,210,267 teaches an apparatus and method for minimizing the amount of smoke to which a shielded person is exposed. The apparatus, or air rail, has a conduit and a fan. The conduit has an air outlet through which air is forced by the fan. In operation, the fan generates an air flow that enters the conduit and exits through the air outlet. The exited air flow is directed generally away from the shielded person and is interposed between the shielded person and the smoke. The exited air flow therefore creates a barrier which minimizes the amount of smoke to which the shielded person is exposed. By minimizing the amount of smoke to which the shielded person is exposed, the apparatus and method creates a better environment for the shielded person. Long et al basically discloses a very simple air curtain that generates upward-directed streams of air to protect a person from smoke. No vortex flow is utilized or contemplated.

SUMMARY OF THE INVENTION

The present invention relates to an apparatus for isolating a volume through use of a vortex flow. The vortices are formed within ducts in an area separate from the region to be isolated, and are driven by fans. Flow straightening vanes are included to remove swirling components in the air flow. Specific applications can include oxygen tents, air curtains, testing chamber apparatus and clean rooms. While two apparatus of the present invention can be used to isolate a central volume, one apparatus can be used to isolate one volume from another.

Thus, it is an object of the present invention to provide a means for isolating a space without the use of physical barriers.

It is a further object of the present invention to utilize a vortex flow to isolate a space without the use of physical barriers.

It is an additional object of the present invention to provide means for an improved pressure chamber.

It is yet a further object of the present invention to provide means for an improved oxygen tent.

It is an additional object of the present invention to provide means for an improved air curtain.

It is yet another object of the present invention to provide means for improved testing chambers.

Another object of the present invention is to provide improved means for a clean room.

SUMMARY OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Certain terminology will be used in the following description for convenience in reference only and will not be limiting. The words "in" and "out" will refer to directions toward and away from, respectively, the geometric center of the device and designated and/or reference parts thereof. The words "up" and "down" will indicate directions relative to the horizontal and as depicted in the various FIGS. The words "clockwise" and "counterclockwise" will indicate rotation relative to a standard "right-handed" coordinate system. Such terminology will include the words above specifically mentioned, derivatives thereof and words of similar import. Furthermore, the isolated region will be sometimes referred to as an "area", as it depicted in the figures, though it should be understood that in application, the isolated region is more appropriately called a "volume".

Figure 1:
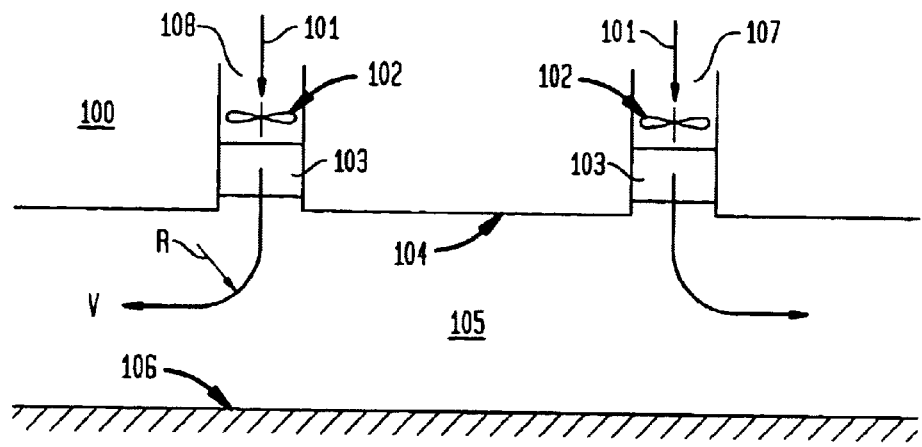
FIG. 1 depicts a basic air barrier system.

FIG. 1 shows a basic system 100 in which air 101 is blown down by fans 102 vertically through ducts 107 and 108 on both sides of an isolated space 105. The isolated space 105 extends vertically from ceiling 104 to floor 106, and horizontally from duct 107 to 108. The ducts 107 and 108 are clearly disposed within ceiling 104. The flow from fans 102 has its rotating component removed by flow straightening vanes 103. Air 101 leaving the ducts 107 and 108 curves outwards from the central area 105. A simplified depiction of the flow shows the air 101 leaving with a radius of curvature R and velocity V. The pressure within the isolated central area 105 is greater than ambient by an amount $\rho V^2/R$; where $\rho$ is the air density and V is the airspeed. The actual airflow, in practice, has been found to be substantially more complicated and is properly determined by integration across the isolated space 105. However, this simplified method is adequate for the purposes herein.

Figure 2:
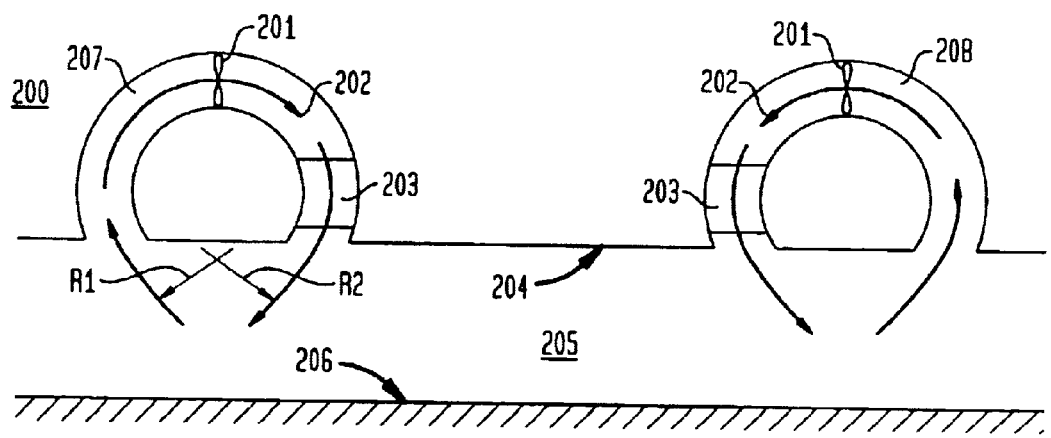
FIG. 2 depicts a vortex air barrier in accordance with the present invention.

FIG. 2 shows a system 200 that is a further development of the system 100 of FIG. 1 to generate a vortex barrier at both ends of an isolated area 205. The reader should keep in mind that to isolate one volume from another (rather than isolate a central volume), only one duct 207 or 208 would be needed. The vortices are formed within ducts 207 and 208 and are driven by fans 201. Ducts 207 and 208 are clearly disposed within ceiling 204. The air 202, as shown, follows a toroidal path through the ducts 207 and 208 and into the region between ceiling 205 and floor 206. Flow straightening vanes 203 are provided to remove swirling components in the air 202 flow. Air pressure within the vortices is below ambient, and can be deduced using Bernoulli from the air speed. The difference between ambient pressure and the pressure within the vortices is given by $\rho V^2/R1$, and the difference between the central area pressure and the vortices pressure is $\rho V^2/R2$. Both the ambient air pressure, and the central area pressure are greater than the pressure at the center of the vortices and are sustained by centrifugal force, i.e., centripetal acceleration, of the air 202 circulating in the vortices. R1 refers to the radius of curvature of the air 202 flow between the duct 207 and 208 and the atmosphere, and R2 refers to the radius of curvature of the air 202 flow between the duct 207 and 208 and the central isolated area 205. When R1=R2, the pressure in the central isolated area 205 is atmospheric. When R1 is greater than R2, the pressure in the central isolated area 205 is above atmospheric. When R1 is less than R2, the pressure in the central isolated area 205 is above atmospheric.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

I claim:

1. An apparatus for isolating a volume and controlling the pressure therein comprising:
   a plurality of duct structures, at least two of said duct structures disposed bilaterally at extreme ends of said volume;
   a plurality of fan means for generating fluid flow, each of said fan means disposed within each of said plurality of duct structures; and
   a plurality of vanes, disposed with said plurality of duct structures, to remove rotational components of said fluid flow;
   wherein said fluid flow, upon flowing through said plurality of duct structures, generates a vortex fluid flow thereby providing a fluidic seal between said volume and the atmosphere;
   wherein at least one of said ducts is configured such that said vortex fluid flow has a first radius of curvature representing a portion of said vortex fluid flow in contact with said atmosphere and a second radius of curvature representing a portion of said vortex flow in contact with said volume; and
   wherein said first radius of curvature, said second radius of curvature, and the speed of said vortex flow determine a pressure differential between said atmosphere and said volume.

2. An apparatus according to claim 1 wherein said plurality of duct structures are disposed within a ceiling.

3. An apparatus according to claim 1 wherein each of said plurality of duct structures are disposed on opposing ends of a doorway.

4. An apparatus according to claim 1 wherein each of said plurality of duct structures are disposed on opposing ends of a cleanroom.

5. An apparatus according to claim 1 wherein each of said plurality of duct structures are disposed on opposing ends of a testing chamber.

6. An apparatus according to claim 1 wherein each of said plurality of duct structures are disposed on opposing ends of an oxygen tent.

7. An apparatus according to claim 1 wherein each of said plurality of duct structures are disposed on opposing sides of a refrigerator entrance.

8. An apparatus according to claim 1 wherein each of said plurality of duct structures are disposed on opposing sides of a region having a different temperature.

9. An apparatus according to claim 1 wherein said plurality of fan means comprises a motor coupled to a propeller.

10. An apparatus according to claim 1 wherein said plurality of fan means comprises a motor coupled to an impeller.

11. An apparatus according to claim 1 wherein said apparatus maintains atmospheric pressure within said volume.

12. An apparatus according to claim 1 wherein said apparatus maintains ambient pressure within said volume.

13. An apparatus according to claim 1 wherein said apparatus maintains a higher than ambient pressure within said volume.

14. An apparatus according to claim 1 wherein said apparatus maintains a lesser than ambient pressure within said volume.

15. A method for isolating a volume, and controlling the pressure therein, said method comprising the steps of:
   generating a first vortex fluid flow on a first side of said volume;
   generating a second vortex fluid flow on a second side of said volume, said second side being substantially opposite from said first side;
   wherein each of said first vortex fluid flow and said second vortex fluid flow comprises a first radius of curvature defining a portion of said vortex fluid flow in contact with ambient fluid and a second radius of curvature defining a portion of said fluid flow in contact with of said volume; and
   wherein said first said radius of curvature, said second radius of curvature and a speed of said fluid flow determine a pressure differential between said ambient fluid and said volume.

16. A method for isolating a first volume from a second volume and controlling a pressure differential therebetween, said method comprising the steps of:
   generating a fluid flow;
   removing the swirling components of said fluid flow;
   guiding said fluid flow into a vortex flow, said vortex flow having a first radius of curvature representing said a portion of said fluid flow in contact with said first volume and a second radius of curvature representing a portion of said vortex flow in contact with said second volume;
   disposing said vortex flow at the intersection between said first volume and said second volume, thereby providing a fluidic seal;
   wherein said first radius of curvature, said second radius of curvature, and the speed of said fluid flow determine said pressure differential between said first volume and said second volume.

17. A method according to claim 16 wherein said generating is performed by a fan.

18. A method according to claim 16 wherein said generating is performed by an impeller.

19. A method according to claim 16 wherein said removing is performed by flow straightening vanes.

20. A method according to claim 16 wherein said guiding is performed by a duct.

21. A method according to claim 16 wherein said guiding is performed by a torus-shaped duct.

22. An apparatus for isolating a first volume from a second volume and controlling a pressure differential therebetween comprising:
   a duct structure; and
   a fan coupled to said duct structure, said fan imparting a fluid flow within said duct structure;
   wherein said fluid flow, upon flowing through said duct structure, generates a vortex fluid flow thereby providing a fluidic seal between said first volume and said second volume;
   wherein said duct is configured such that said vortex fluid flow has a first radius of curvature representing a portion of said vortex fluid flow in contact with said first volume and a second radius of curvature representing a portion of said vortex flow in contact with said second volume; and
   wherein said first radius of curvature, said second radius of curvature, and the speed of said vortex flow determine said pressure differential between said first volume and said second volume.

23. An apparatus according to claim 22 wherein said duct structure is disposed within a ceiling.

24. An apparatus according to claim 22 wherein said duct structure is disposed proximal to a doorway.

25. An apparatus according to claim 22 wherein said duct structure is disposed on an end of a cleanroom.

26. An apparatus according to claim 22 wherein said duct structures is disposed on an end of a testing chamber.

27. An apparatus according to claim 22 wherein said duct structure is disposed on an end of an oxygen tent.

28. An apparatus according to claim 22 wherein said duct structure is disposed on proximal to a refrigerator entrance.

29. An apparatus according to claim 22 wherein said first volume and said second volume differ in temperature.

30. An apparatus according to claim 22 wherein said fan comprises a propeller.

31. An apparatus according to claim 22 wherein said fan comprises an impeller.

32. An apparatus according to claim 22 wherein said apparatus maintains atmospheric pressure within at least one of said first volume and said second volume.

33. An apparatus according to claim 22 wherein said apparatus maintains equal pressures within said first volume and said second volume.

34. An apparatus according to claim 22 wherein said apparatus maintains a higher pressure in said first volume than the pressure within said second volume.

35. An apparatus according to claim 22 wherein said apparatus maintains a lesser pressure in said first volume than the pressure in said second volume.

* * * * *